United States Patent
Köhnlein et al.

(10) Patent No.: US 10,590,828 B2
(45) Date of Patent: Mar. 17, 2020

(54) EXHAUST GAS OUTLET SYSTEM FOR A MOTOR VEHICLE, MOTOR VEHICLE HAVING SUCH AN EXHAUST GAS OUTLET SYSTEM, AND METHOD FOR PRODUCING AN EXHAUST GAS OUTLET SYSTEM

(71) Applicant: Cisma Solutions APS, Silkeborg (DK)

(72) Inventors: Sebastian Köhnlein, Ehningen (DE); Philipp Eisele, Stuttgart (DE); Sebastian Radtke, Leinfelden-Echterdingen (DE); Angel Orille, Horb am Neckar (DE); Jesus Larraz, Stuttgart (DE)

(73) Assignee: CISMA SOLUTIONS APS, Silkeborg (DK)

( * ) Notice: Subject to any disclaimer, the term of this patent is extended or adjusted under 35 U.S.C. 154(b) by 3 days.

(21) Appl. No.: 16/058,028

(22) Filed: Aug. 8, 2018

(65) Prior Publication Data

US 2018/0347441 A1   Dec. 6, 2018

Related U.S. Application Data

(63) Continuation-in-part of application No. PCT/EP2017/050513, filed on Jan. 12, 2017.

(30) Foreign Application Priority Data

Feb. 11, 2016   (DE) .......................... 10 2016 202 056

(51) Int. Cl.
*F01N 13/18*   (2010.01)
*F01N 13/20*   (2010.01)
(Continued)

(52) U.S. Cl.
CPC .......... *F01N 13/1844* (2013.01); *B60K 13/04* (2013.01); *F01N 13/082* (2013.01);
(Continued)

(58) Field of Classification Search
CPC .............. F01N 13/1844; F01N 13/082; F01N 13/1805; F01N 13/1888; F01N 13/20; F01N 2450/18; F01N 2450/24
(Continued)

(56) References Cited

U.S. PATENT DOCUMENTS 2,244,393 A * 6/1941 Haas ..................... F01N 13/18
                                                         181/243
2,382,159 A * 8/1945 Klemm ............... F01N 13/1844
                                                         181/241

(Continued)

FOREIGN PATENT DOCUMENTS

| DE | 195 17 462 A1 | 11/1995 |
|----|---------------|---------|
| DE | 10 2012 023 804 A1 | 6/2014 |
| KR | 10 2012 0127950 A | 11/2012 |

*Primary Examiner* — Anna M Momper
*Assistant Examiner* — Fannie C Kee
(74) *Attorney, Agent, or Firm* — Hackler Daghighian Martino & Novak

(57) ABSTRACT

An exhaust gas outlet system for a motor vehicle has an end pipe and a cover. The end pipe cover has an end pipe cover inner and outer wall constructed with at least two walls. The end pipe cover inner wall is constructed in at least two parts, can be closed radially around the end pipe and can be at least partially arranged in a positive-locking manner on the end pipe so that the end pipe cover inner wall in the state thereof mounted on the end pipe is not axially displaceable. A first annular securing element keeps the end pipe cover inner wall radially fixed on the end pipe. The end pipe cover outer wall can be pushed axially over the end pipe cover inner wall. The end pipe cover outer wall is fixed by means of a locking connection axially to the end pipe cover inner wall.

10 Claims, 5 Drawing Sheets

(51) Int. Cl.
*F01N 13/08* (2010.01)
*B60K 13/04* (2006.01)

(52) U.S. Cl.
CPC ..... *F01N 13/1805* (2013.01); *F01N 13/1888* (2013.01); *F01N 13/20* (2013.01); *F01N 2450/18* (2013.01); *F01N 2470/24* (2013.01)

(58) Field of Classification Search
USPC ................................... 285/53, 123.1, 123.2
See application file for complete search history.

(56) References Cited

U.S. PATENT DOCUMENTS

| | | | |
|---|---|---|---|
| 3,106,984 A * | 10/1963 | Carter | F01N 13/1805 181/238 |
| 4,096,350 A * | 6/1978 | Mayr | H01R 9/0503 174/88 C |
| 4,233,812 A * | 11/1980 | Leistritz | F01N 1/006 60/320 |
| 7,007,720 B1 | 3/2006 | Chase | |
| 2002/0053483 A1 | 5/2002 | Ebinger et al. | |
| 2006/0010861 A1 | 1/2006 | Heydens | |
| 2010/0212767 A1 | 8/2010 | Derry | |

\* cited by examiner

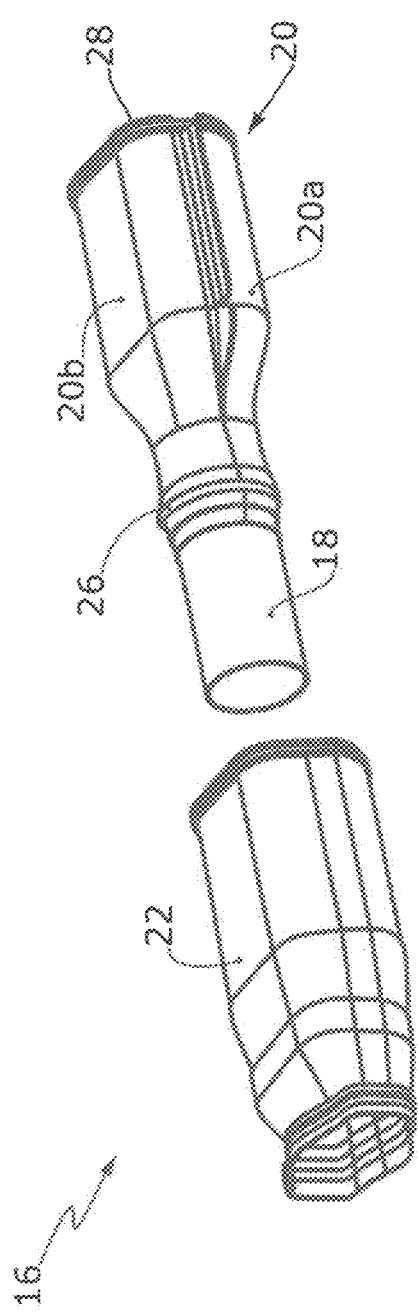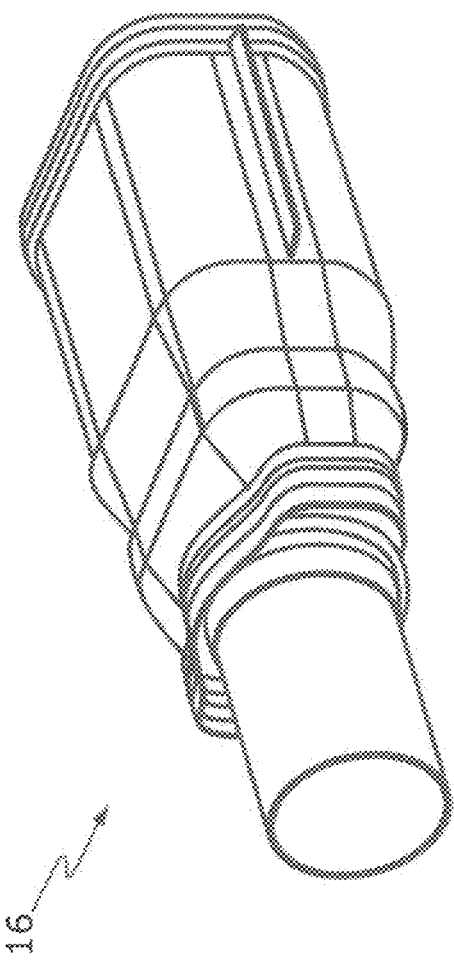

EXHAUST GAS OUTLET SYSTEM FOR A MOTOR VEHICLE, MOTOR VEHICLE HAVING SUCH AN EXHAUST GAS OUTLET SYSTEM, AND METHOD FOR PRODUCING AN EXHAUST GAS OUTLET SYSTEM

CROSS-REFERENCE TO RELATED APPLICATIONS

This continuation application claims priority to PCT/EP2017/050513 filed on Jan. 12, 2017 which has published as WO 2017/137203 A1 and also the German application number 10 2016 202 056.0 filed on Feb. 11, 2016, the entire contents of which are fully incorporated herein with these references.

FIELD OF THE INVENTION

The invention relates to an exhaust gas outlet system for a motor vehicle. The invention further relates to a motor vehicle having such an exhaust gas outlet system and a method for producing an exhaust gas outlet system.

BACKGROUND OF THE INVENTION

It is known, in order to adjust the power and the optical and acoustic properties of a motor vehicle, to provide an end pipe of an exhaust gas outlet system with an end pipe cover.

U.S. 2002/0053483 A1 discloses the securing of a dual-walled end pipe cover to an end pipe by means of a screw.

From US 2006/0010861 A1 an exhaust gas filter is further disclosed. The exhaust gas filter has two substantially cylindrical housing portions which are partially pushed one inside the other. A locking connection fixes the position of the two housing portions in the direction of the longitudinal axis of the exhaust gas filter. A release of the locking connection is prevented by means of a hose clamp which presses a first housing portion radially on a second housing portion. In order to seal the connection of the two housing portions, an O-ring is provided between the housing portions.

KR 10 2012 0127950 A discloses another exhaust gas filter. The known exhaust gas filter has an end pipe. A two-part tubular cover is arranged around a central portion of the end pipe.

DE 10 2012 023 804 A1 finally discloses an exhaust gas system for a motor vehicle. The exhaust gas system has an end pipe having an end pipe cover placed on the end pipe. The end pipe has an annular indentation in order to direct exhaust gas flowing out of the end pipe in the direction of the central longitudinal axis of the end pipe.

An object of the present invention is accordingly to provide an exhaust gas outlet system in which an end pipe cover is secured to an end pipe in a secure but nonetheless simple manner. An object of the present invention is further to provide a motor vehicle having such an exhaust gas outlet system and a method for producing an exhaust gas outlet system.

SUMMARY OF THE INVENTION

This object is achieved with an exhaust gas outlet system according to the independent patent claims. The dependent claims set out advantageous developments.

The object is consequently achieved according to the invention by an exhaust gas outlet system having an end pipe. The end pipe can be connected in fluid terms to an exhaust gas system of a motor vehicle. The exhaust gas outlet system has an end pipe cover which is arranged at least partially on the end pipe. The end pipe cover has an end pipe cover inner wall and an end pipe cover outer wall which is arranged so as to be radially offset with respect to the end pipe cover inner wall. The end pipe cover inner wall is constructed in several parts and the end pipe cover inner wall is at least partially arranged by means of a first positive-locking connection on the end pipe. A first annular securing element secures the arrangement of the end pipe cover on the end pipe. The end pipe cover outer wall is at least partially pushed onto the end pipe cover inner wall.

As a result of the first positive-locking connection, a secure arrangement of the end pipe cover on the end pipe is achieved. At the same time, the end pipe cover can be assembled in a simple manner on the end pipe.

In a particularly preferred embodiment of the invention, the connection between the end pipe cover and end pipe is carried out completely without any materially engaging connection. It is thereby possible in particular to dispense with a welding method when the end pipe cover is assembled on the end pipe.

The first positive-locking connection may be constructed in the form of a recess in which a projection at least partially engages in a positive-locking manner. Preferably, the first portion of the first positive-locking connection is constructed in the form of a first annular recess and the second portion of the first positive-locking connection is constructed in the form of a second annular recess. Such annular recesses can be produced in a simple manner and impede the flow of exhaust gas only marginally.

The exhaust gas outlet system may have in the end pipe cover outer wall a third annular recess. The first annular securing element is in this instance at least partially arranged in the third annular recess. A second positive-locking connection is thereby produced between the end pipe cover outer wall and the end pipe cover inner wall via the first annular securing element.

In order to secure the end pipe cover inner wall constructed in several pieces in axially mutually opposed regions against radial disintegration, the exhaust gas outlet system preferably has a second annular securing element.

The first annular securing element and/or the second annular securing element may be constructed in the form of an O-ring, a hose clamp, an in particular partially interrupted metal ring or a resilient ring.

The second annular securing element is preferably arranged at least partially in a fourth annular recess which is constructed in the end pipe cover inner wall.

A particularly reliable connection between the end pipe cover outer wall and the end pipe cover inner wall is achieved when the exhaust gas outlet system in the end pipe cover outer wall has a fifth annular recess, wherein the second annular securing element is at least partially arranged in the fifth annular recess. A third positive-locking connection of the exhaust gas outlet system between the end pipe cover outer wall and the end pipe cover inner wall is thereby constructed via the second annular securing element.

The object according to the invention is further achieved by a motor vehicle having an exhaust gas outlet system described above, wherein the end pipe of the exhaust gas outlet system is connected to the exhaust gas system of the motor vehicle.

The object according to the invention is further achieved with a method for producing an exhaust gas outlet system, in particular an exhaust gas outlet system described above, wherein the method has the following method steps:

I) producing a first annular recess in the end pipe;

II) pushing the end pipe cover outer wall onto the end pipe;
III) arranging the end pipe cover inner wall on the end pipe, wherein the end pipe cover inner wall has a second annular recess which is arranged at least partially in the first annular recess of the end pipe, whereby a first positive-locking connection between the end pipe cover inner wall and the end pipe is produced;
IV) arranging the first annular securing element in the region of the first annular recess, whereby the end pipe cover inner wall is secured to the end pipe;
V) pushing the end pipe cover outer wall onto the end pipe cover inner wall.

The method according to the invention thereby allows an end pipe cover to be assembled on an end pipe in a manner which can also be carried out by untrained operators, wherein the exhaust gas outlet system can nonetheless be produced in a structurally simple manner.

The method may have the following method step between the method step IV and the method step VI:
V) arranging a second annular securing element on the end pipe cover inner wall, wherein the second annular securing element is arranged axially opposite the first annular securing element. The second annular securing element is preferably arranged in a fourth annular recess of the end pipe cover inner wall.

Other features and advantages of the invention will be appreciated from the following detailed description of a plurality of embodiments of the invention, from the patent claims and with reference to the Figures of the drawings, which show details which are significant to the invention.

The features which are shown in the drawings are illustrated in such a manner that the specific features according to the invention can be made clearly visible. The different features may each be implemented individually per se or together in any combinations in variants of the invention.

BRIEF DESCRIPTION OF THE DRAWINGS

In the drawings:
FIG. 2b is a perspective view of the exhaust gas outlet system according to FIG. 2a in a partially assembled state;
FIG. 2c is a perspective view of the exhaust gas outlet system according to FIG. 2b in a completely assembled state.

DETAILED DESCRIPTION OF THE PREFERRED EMBODIMENTS

Figure 1:
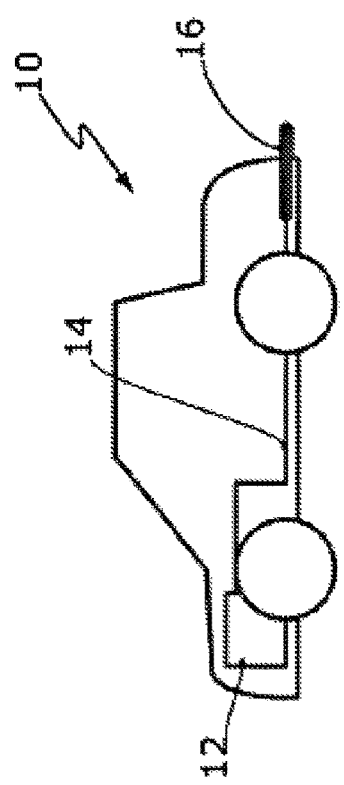
FIG. 1 is a schematic illustration of a motor vehicle having an exhaust gas outlet system.

FIG. 1 shows a motor vehicle 10 having an internal combustion engine 12 and an exhaust gas system 14 which is connected to the internal combustion engine 12. The exhaust gas system 14 is connected to an exhaust gas outlet system 16 in fluid terms.

Figure 2A:
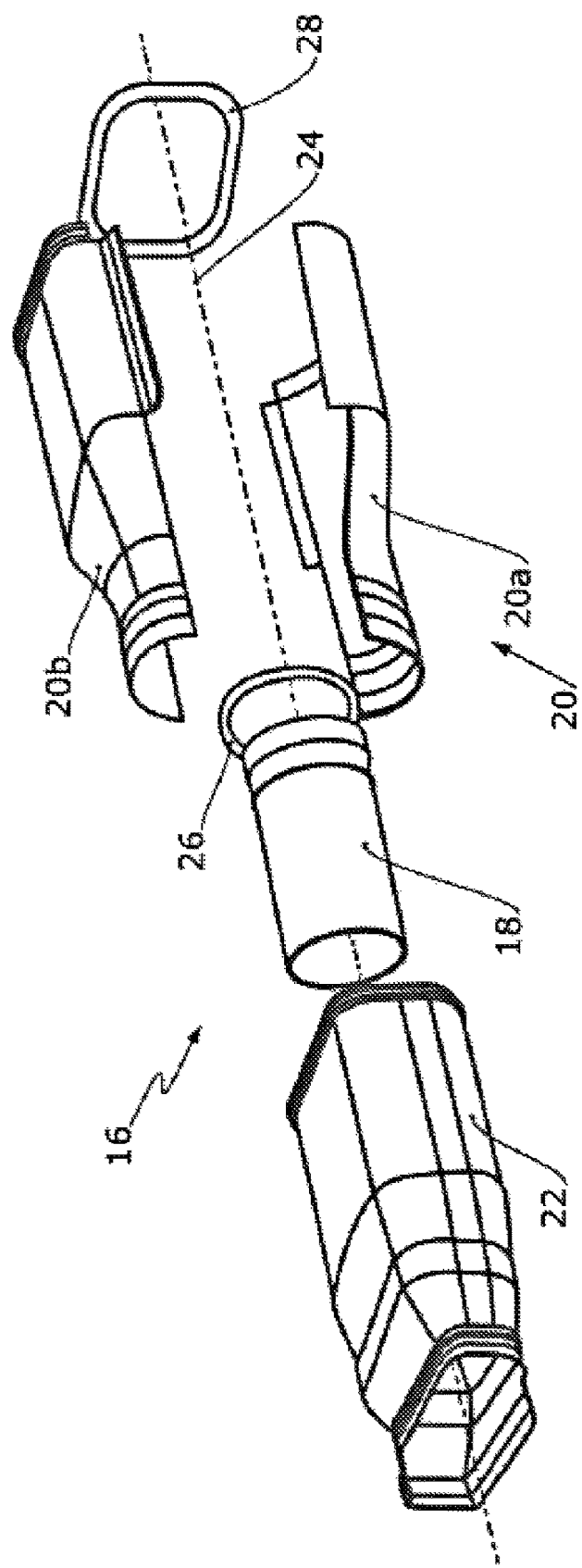
FIG. 2a is a perspective exploded view of the exhaust gas outlet system according to FIG. 1.

FIG. 2a shows the exhaust gas outlet system 16. The exhaust gas outlet system 16 has an end pipe 18, an end pipe cover inner wall 20 and an end pipe cover outer wall 22. In FIG. 2a, only a portion of the end pipe 18 is illustrated. The end pipe cover inner wall 20 is constructed in two portions. It has a first portion 20a and a second portion 20b. In this instance, the end pipe cover inner wall 20 is constructed so as to be divided parallel with the longitudinal axis 24 of the exhaust gas outlet system 16. The end pipe cover inner wall 20 is consequently constructed so as to be divided in an axial direction.

Generally in the context of the present invention, directions parallel with or in the direction of the longitudinal axis 24 of the exhaust gas outlet system 16 are referred to as "axial" and directions perpendicular to the longitudinal axis 24 of the exhaust gas outlet system 16 are referred to as "radial".

The portions 20a, 20b may be constructed so as to be able to be locked to each other. The fixing of the portions 20a, 20b is carried out in this instance by means of a first annular securing element 26 and a second annular securing element 28.

FIG. 2b shows the exhaust gas outlet system 16, wherein the annular securing elements 26, 28 radially connect the portions 20a, 20b and retain them radially on the end pipe 18. In a final assembly step, the end pipe cover outer wall 22 is pushed axially onto the end pipe 18 in the direction of the end pipe cover inner wall 20 and further, at least for the most part of the end pipe cover outer wall 22, over the end pipe cover inner wall 20.

FIG. 2c shows the exhaust gas outlet system 16 in the fully assembled state.

Figure 2D:
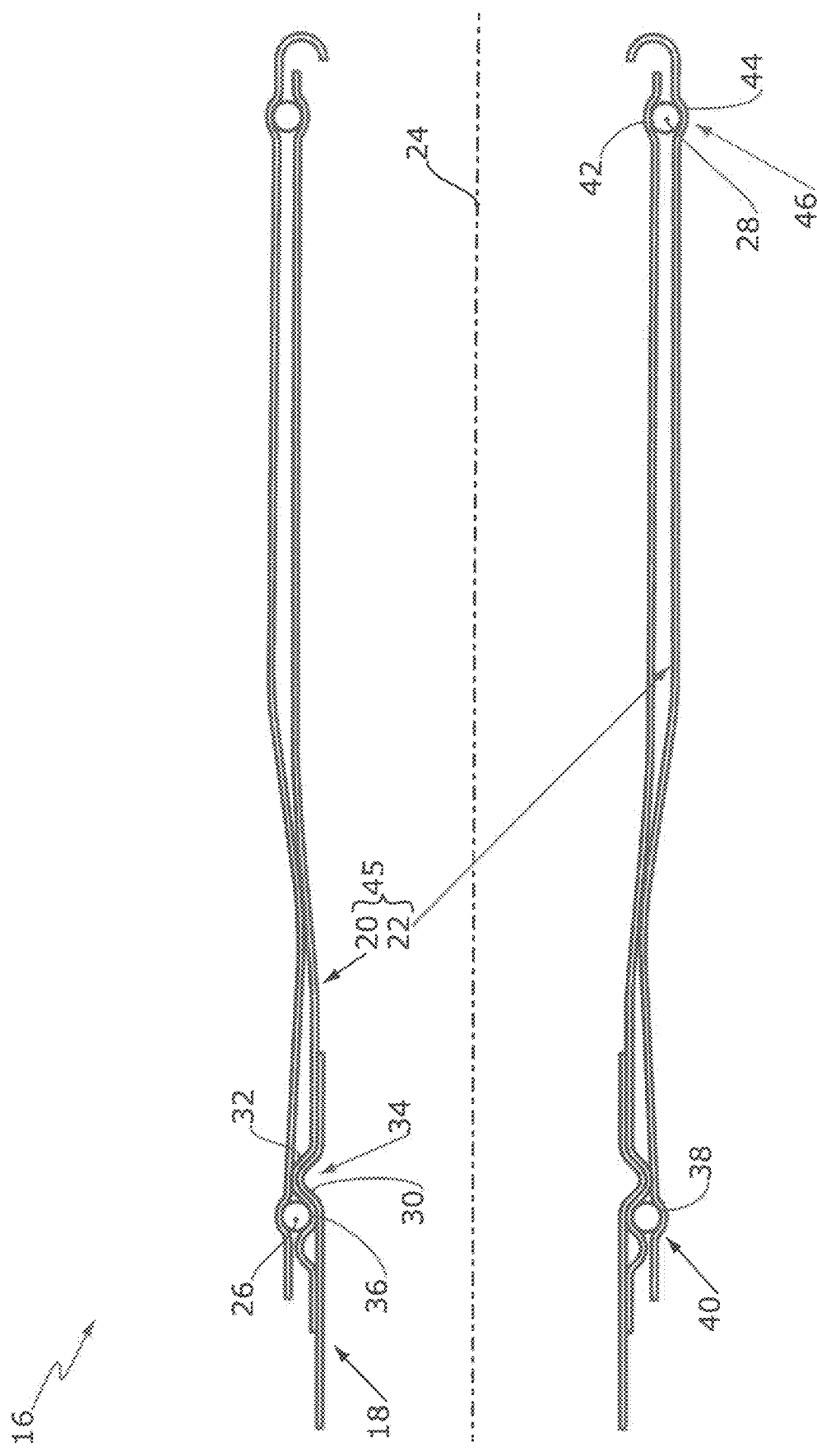
FIG. 2d is a schematic side view of a longitudinal section through the exhaust gas outlet system according to FIG. 2c.

FIG. 2d is a schematic axial section through the exhaust gas outlet system 16 according to FIG. 2c. FIG. 2d shows that the exhaust gas outlet system 16 is constructed substantially axially symmetrically with respect to the longitudinal axis 24 of the exhaust gas outlet system 16. The exhaust gas outlet system 16 has on the end pipe 18 a first annular recess 30. Furthermore, the exhaust gas outlet system 16 has at the end pipe cover inner wall 20 a second annular recess 32. Both the first annular recess 30 and the second annular recess 32 are constructed radially with respect to the longitudinal axis 24. The first annular recess 30 closely fits in the second annular recess 32. The first annular recess 30 constitutes a first portion, the second annular recess 32 a second portion of a first positive-locking connection 34 of the exhaust gas outlet system 16. The first positive-locking connection 34 secures the end pipe cover inner wall 20 against axial displacement relative to the end pipe 18. Radially, the end pipe cover inner wall 20 is secured relative to the end pipe 18 by means of the first annular securing element 26. The first annular securing element 26 is in this instance arranged in an annular recess indentation 36 of the end pipe cover inner wall 20 and thereby axially fixed.

The end pipe cover outer wall 22 has a third annular recess 38. The third annular recess 38 is constructed radially. The first annular securing element 26 is partially received in the third annular recess 38. There is thereby produced a second positive-locking connection 40, which fixes the end pipe cover outer wall 22 axially relative to the end pipe cover inner wall 22.

A fourth annular recess 42 is constructed in the end pipe cover inner wall 20 in the outlet region of the exhaust gas outlet system 16. The second annular securing element 28 is partially arranged in the fourth annular recess 42. The fourth annular recess 42 is constructed radially. Furthermore, the end pipe cover outer wall 22 has a fifth annular recess 44 in which the second annular securing element 28 is partially arranged. The fifth annular recess 44 is constructed in a radial manner. As a result of the fourth annular recess 42, the fifth annular recess 44 and the second securing element 28, there is produced a third positive-locking connection 46 of the exhaust gas outlet system 16 which additionally secures the end pipe cover outer wall 22 against axial displacement relative to the end pipe cover inner wall 20.

The end pipe cover inner wall 20 forms an end pipe cover 45 together with the end pipe cover outer wall 22.

By way of example, FIGS. 3a to 3f show different embodiments of annular securing elements 48a to 48g for use as a first annular securing element 26 or second annular securing element 28 (see FIGS. 2a, 2b and 2d).

Figure 3A:
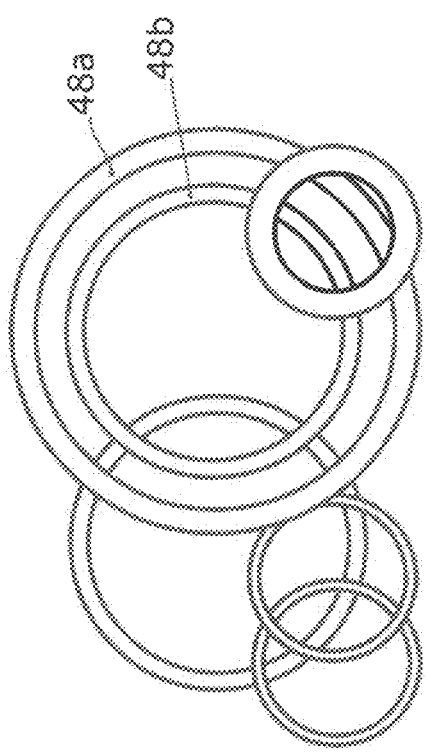
FIG. 3a is a perspective view of a plurality of annular securing elements in the form of O-rings.

FIG. 3a shows annular securing elements 48a, 48b in the form of O-rings, of which for reasons of clarity only two O-rings are provided with a reference numeral.

Figure 3D:
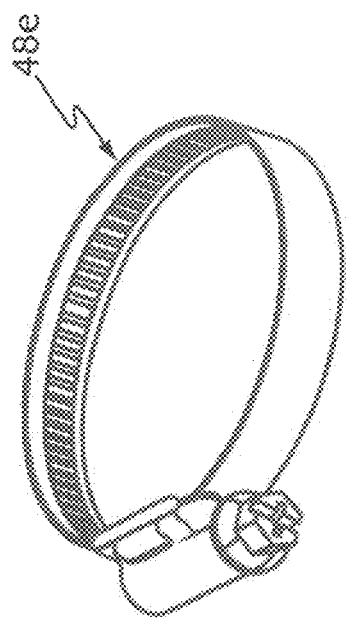
FIGS. 3b to 3d are perspective views of additional securing elements in the form of hose clamps.
Figure 3C:
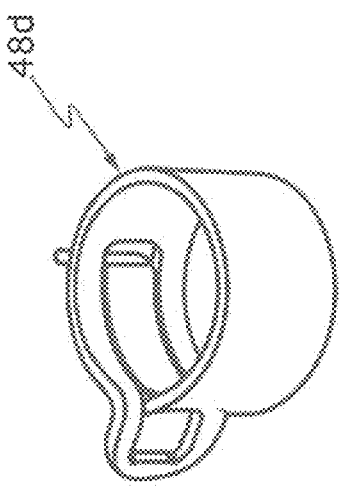
Figure 3B:
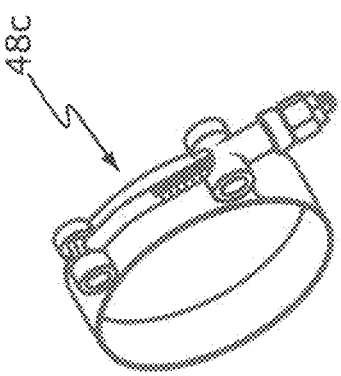

FIGS. 3b to 3d show different embodiments of annular securing elements in the form of hose clamps or hose clips 48c to 48e.

Figure 3F:
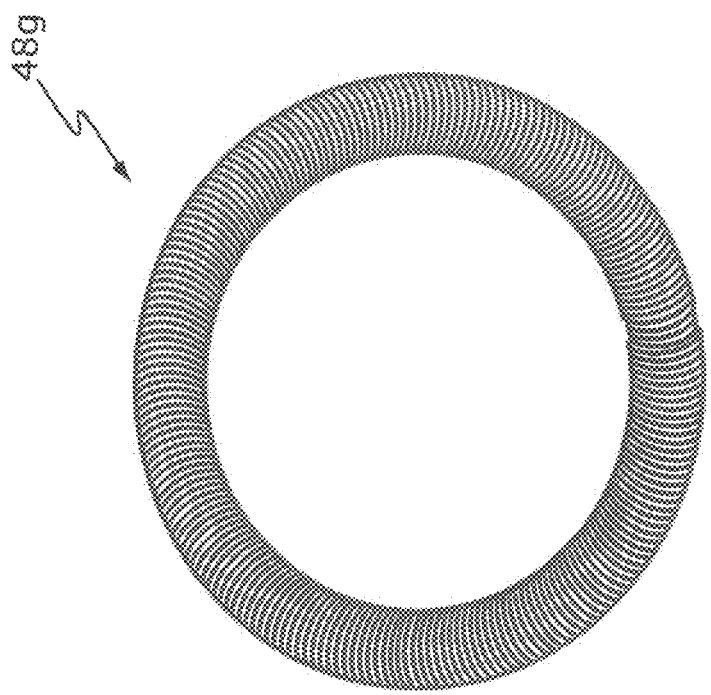
FIG. 3f is a perspective view of another annular securing element in the form of a resilient ring.
Figure 3E:
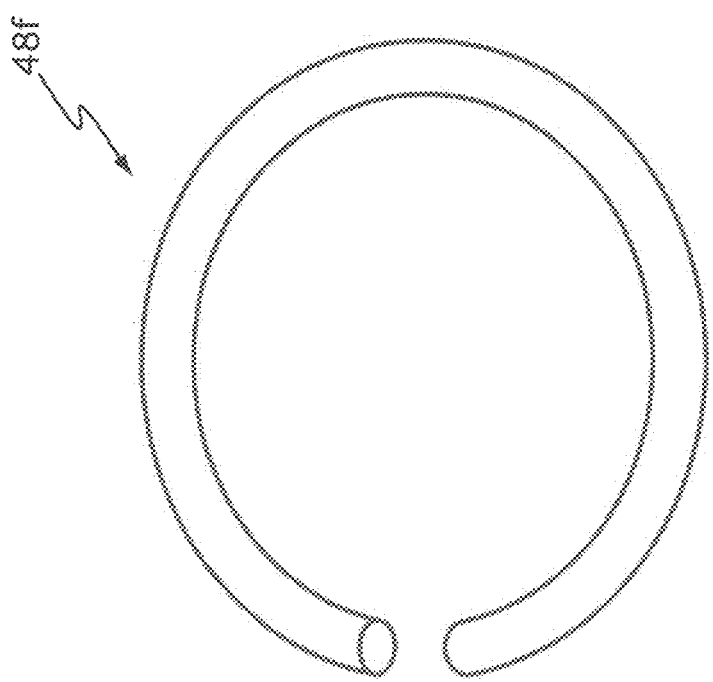
FIG. 3e is a perspective view of another annular securing element in the form of a partially interrupted metal ring.

FIG. 3e shows a particularly preferred embodiment of an annular securing element 48f. The annular securing element 48f is constructed in the form of an open metal ring. Preferably, the annular securing element 48f is constructed in the form of an open steel ring. If at least one annular securing element 26, 28 (see FIGS. 2a, 2b and 2d) is constructed in the form of an annular securing element 48f according to FIG. 3e, the exhaust gas outlet system 16 (see FIGS. 1 and 2a to 2d) can be constructed in a structurally particularly simple and cost-effective manner.

FIG. 3f shows another annular securing element 48g in the form of a continuous helical spring.

Taking an overview of all the Figures of the drawings, the present invention in summary relates to an exhaust gas outlet system 16 for a motor vehicle 10 having an end pipe 18 and an end pipe cover 45 which is arranged on the end pipe 18. The end pipe cover 45 is constructed as a result of an end pipe cover inner wall 20 and an end pipe cover outer wall 22 with at least two walls. The end pipe cover inner wall 20 is constructed at least in two parts and can be closed radially around the end pipe 18. The end pipe cover inner wall 20 can be arranged at least partially in a positive-locking manner on the end pipe 18 so that the end pipe cover inner wall 20 in the state thereof mounted on the end pipe 18 cannot be axially displaced. A first annular securing element 26 keeps the end pipe cover inner wall 20 radially fixed on the end pipe 18. The end pipe cover outer wall 22 can be pushed axially over the end pipe cover inner wall 20. The end pipe cover outer wall 22 is preferably axially fixed to the end pipe cover inner wall 20 by means of a locking connection.

What is claimed is:

1. An exhaust gas outlet system for attachment to an exhaust gas system of a motor vehicle, the exhaust gas outlet system comprising:
    a) an end pipe for fluid connection to the exhaust gas system of the motor vehicle, wherein the end pipe defines and extends along a longitudinal axis, and wherein the end pipe has a first annular recess;
    b) an end pipe cover having:
        i) an at least two-part end pipe cover inner wall comprising a first portion and a second portion divided parallel with the longitudinal axis, wherein the first portion and the second portion cooperatively have a second annular recess;
        ii) an end pipe cover outer wall which can be pushed axially onto the at least two-part end pipe cover inner wall; and
    c) a first annular securing element;
    d) wherein the first portion and second portion of the at least two-part end pipe cover inner wall are configured to be disposed about the end pipe where the first annular recess closely fits in the second annular recess forming a first positive-locking connection securing the at least two-part end pipe cover inner wall against axial displacement along the longitudinal axis relative to the end pipe;
    e) wherein, in the region of the first positive-locking connection, the first annular securing element is disposed about the at least two-part end pipe cover inner wall and radially fixes the first portion to the second portion and radially fixes the at least two-part end pipe cover inner wall to the end pipe.

2. The exhaust gas outlet system according to claim 1, wherein the first positive locking connection between the end pipe cover and end pipe is carried out without any welding.

3. The exhaust gas outlet system according to claim 1, wherein the exhaust gas outlet system has in the end pipe cover outer wall a third annular recess in which the first annular securing element is at least partially arranged so that a second positive-locking connection is formed.

4. The exhaust gas outlet system according to claim 3, wherein the exhaust gas outlet system has a second annular securing element which radially fixes the first and second portions of the at least two-part end pipe cover inner wall, wherein the second annular securing element is arranged axially opposite the first annular securing element on the at least two-part end pipe cover inner wall.

5. The exhaust gas outlet system according to claim 4, wherein the exhaust gas outlet system has in the at least two-part end pipe cover inner wall a fourth annular recess in which the second annular securing element is at least partially arranged.

6. The exhaust gas outlet system according to claim 5, wherein the exhaust gas outlet system has in the end pipe cover outer wall a fifth annular recess in which the second annular securing element is at least partially arranged so that a third positive-locking connection is formed.

7. The exhaust gas outlet system according to claim 5, wherein both the first annular recess, the second annular recess, the third annular recess and the fourth annular recess are constructed radially with respect to the longitudinal axis.

8. The exhaust gas outlet system according to claim 3, wherein both the first annular recess, the second annular recess and the third annular recess are constructed radially with respect to the longitudinal axis.

9. The motor vehicle having the exhaust gas outlet system according to claim 1, wherein the end pipe is connected to the exhaust gas system of the motor vehicle, wherein the end pipe and exhaust gas system are in fluid communication.

10. The exhaust gas outlet system according to claim 1, wherein both the first annular recess and the second annular recess are constructed radially with respect to the longitudinal axis.

* * * * *